United States Patent [19]

Landa

[11] 4,400,739
[45] Aug. 23, 1983

[54] MICROBALLISTIC FACSIMILE SCANNER AND RECORDER

[75] Inventor: Benzion Landa, Edmonton, Canada

[73] Assignee: Savin Corporation, Valhalla, N.Y.

[21] Appl. No.: 267,674

[22] Filed: May 27, 1981

[51] Int. Cl.³ ............................................. H04N 1/10
[52] U.S. Cl. ........................................ 358/293; 355/8
[58] Field of Search .................... 355/3 R, 8, 11, 49, 355/51, 69; 358/293

[56] References Cited

U.S. PATENT DOCUMENTS

| | | | |
|---|---|---|---|
| 3,112,358 | 11/1963 | Ueno | 358/293 |
| 3,555,266 | 1/1971 | Dixon et al. | 355/51 X |
| 3,679,306 | 7/1972 | Du Bois et al. | 355/11 X |
| 3,698,815 | 10/1972 | Thomas | 355/8 X |
| 3,729,248 | 4/1973 | Beduchaud | 358/293 X |
| 3,930,119 | 12/1975 | Schmidt et al. | 358/293 X |
| 4,153,364 | 5/1979 | Suzuki et al. | 355/8 X |

Primary Examiner—Fred L. Braun
Attorney, Agent, or Firm—Shenier & O'Connor

[57] ABSTRACT

A facsimile scanner in which each successive line of an original is scanned by firing a light-reflective or light-refractive spherical projectile along a path over which an optical image of that line is formed to produce a time-varying pattern of reflected or refracted light from the projectile as it traverses the path. A photodetector responsive to light diverted from the projectile provides the facsimile signal. In the recording mode, each successive line of a facsimile signal is recorded by illuminating the same projectile with light modulated by the facsimile signal as the projectile traverses its path to produce a spatially varying pattern of reflected or refracted light, an optical image of which is formed on a recording medium such as the photoconductor of an electrophotographic copier. The rate at which the photodetector output is sampled in the scanning mode and at which the facsimile signal is fed to the modulator in the recording mode is adjusted for the actual measured velocity of each successively fired projectile.

14 Claims, 12 Drawing Figures

MICROBALLISTIC FACSIMILE SCANNER AND RECORDER

BACKGROUND OF THE INVENTION

This invention relates to apparatus for scanning a graphic original to produce a facsimile signal and for recording such a signal as an image of the original on a record medium.

Facsimile scanners and recorders for converting graphic images to electrical facsimile signals and vice versa are well known in the art. Typically, in facsimile scanners of the prior art, various movable slots, mirrors or other mechanical elements have been used to scan a document line, for example by moving a light spot across the width of the document or by moving the effective aperture of a photodetector across the width of the focused image. In all of those systems, the size and effective mass of the moving elements is quite large, limiting the frequency at which lines can be scanned without excessively large accelerating forces. Attempts to increase the operating frequency by reducing the effective mass of the moving elements only increase the susceptibility of these elements to the jarring effects of mechanical vibration.

SUMMARY OF THE INVENTION

One of the objects of my invention is to provide a facsimile scanner which can operate in either a scanning or a recording mode.

Another object of my invention is to provide a facsimile scanner which is capable of high-speed, high-resolution operation.

Yet another object of my invention is to provide a facsimile scanner which is compatible with an electrophotographic copier.

Another object of my invention is to provide a facsimile scanner which is relatively immune from the effects of mechanical vibration.

Still another object of my invention is to provide a facsimile scanner which ensures the registration of successive scanning lines.

A further object of my invention is to provide a facsimile scanner which is simple and inexpensive.

In general, my invention contemplates a facsimile scanner in which each successive line of an original is scanned by firing a light-reflecting or light-refracting projectile along a path over which an image of that line is formed to produce a time-varying pattern of reflected or refracted light and shade from the projectile as it traverses the path. A photodetector responsive to light from the projectile provides the facsimile signal. Preferably, the projectiles comprise specularly reflective spheres successively fired from a gun, while the line image of the original is formed using the optical scanning system of an electrophotographic copier.

In another aspect, my invention contemplates a facsimile recorder in which each successive line of a facsimile signal is recorded by firing a projectile along a path and illuminating the projectile in response to the facsimile signal as the projectile traverses the path to produce a spatially varying pattern of light and shade along the path. The spatially varying pattern is suitably optically coupled to a record medium. Preferably, the projectiles are specularly reflective spheres fired from the gun of the scanner described above, while the record medium is the photoconductive imaging surface of the electrophotographic copier of which the optical scanning system and the photoconductive imaging surface are a part.

Since the effective mass of my facsimile scanner and recorder is simply the mass of the projectiles, which may typically be one millimeter or less in diameter, my scanner is capable of a much higher scanning rate than mechanical scanners of the prior art. The only effective limitation on the scanning rate is the velocity at which the projectiles are fired. The projectiles, once fired, move along the path under their own intertia and not in response to any continuing external force. That is, they are mechanically decoupled from the scanning apparatus and thus isolated from the disturbing effects of mechanical vibration.

BRIEF DESCRIPTION OF THE DRAWINGS

In the accompanying drawings to which reference is made in the instant specification and in which like reference characters are used to indicate like parts in the various views.

DESCRIPTION OF THE PREFERRED EMBODIMENT

Figure 1:
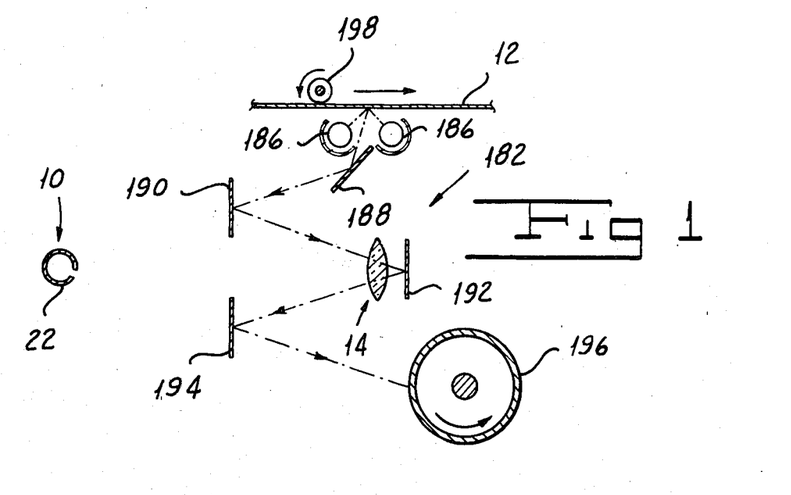
FIG. 1 is a section of an electrophotographic copier incorporating my facsimile scanner and recorder, shown in a copying mode of operation.

Referring now to FIG. 1, my facsimile scanner and recorder, indicated generally by the reference numeral 10, may be incorporated in an electrophotographic copier indicated generally by the reference numeral 182. In the copying mode of operation of the copier 182, shown in FIG. 1, one or more feed rollers 198 move an original document 12 past a stationary pair of high-intensity illumination lamps 186 extending transversely of the direction of movement of the document 12. A first reflector 188 such as a mirror or a prism directs light reflected from the surface of the document 12 to a second reflector 190, which in turn directs light from the document toward a lens 14 having an internal mirror element 192. Lens 14 redirects light from the document 12 to a reflector 194 which directs the light onto the photoconductive surface of a rotatable drum 196.

In the mode of operation shown in FIG. 1, roller 198 moves document 12 past illumination lamps 186 in synchronism with the counterclockwise rotation of the drum 196 to effect stripwise exposure of the drum surface to an image of the graphic matter on document 12. In a manner well known in the art, the surface of drum 196, which has previously been provided with a uniform electrostatic charge by suitable means such as a corona (not shown), is selectively discharged in areas exposed to light to form an electrostatic image of the original document 12. This latent image is then developed and thereafter transferred to a suitable medium such as a sheet of paper by suitable means (not shown) disposed about the periphery of the drum 196 in a manner also well known in the art.

Figure 2:
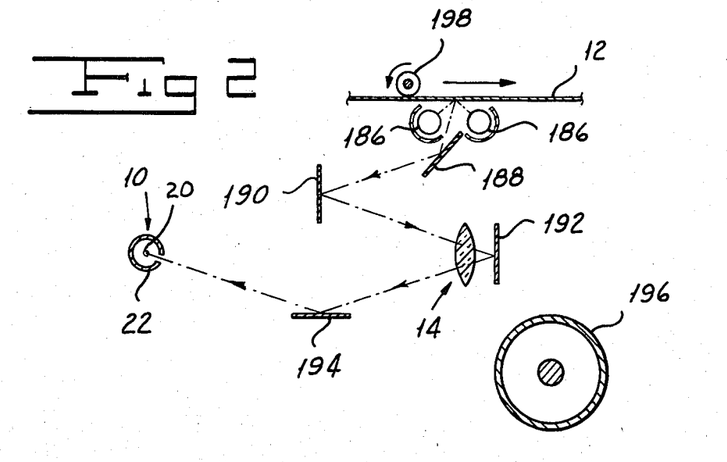
FIG. 2 is a section of the copier of FIG. 1 in a mode of operation in which the original document is scanned to provide a facsimile signal.

In FIG. 2 I show the copier 182 in a scanning mode of operation in which, rather than forming a focused image on the surface of drum 196, the optical system of the copier is rearranged by rotating reflector 194 to form a focused image on the ball path of the scanner 10, to be described below.

Figure 3:
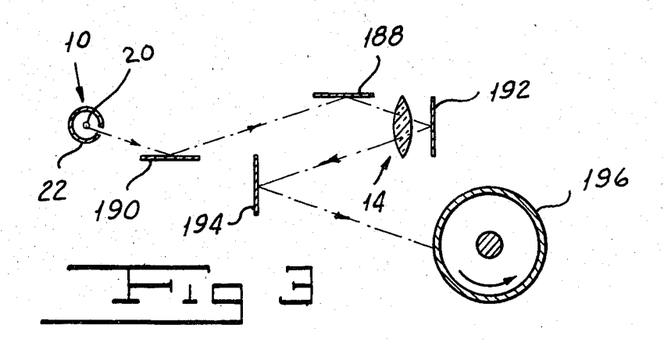
FIG. 3 is a section of the copier of FIG. 1 in a mode of operation in which a facsimile signal is recorded as a latent image on the copier imaging surface.

In FIG. 3 I show a mode of operation of the copier 182 in which reflectors 188 and 190 are translated and rotated to form on the surface of drum 196 a focused image of the line pattern of light and shade generated by the scanner 10 in a manner to be described below. It will be apparent to those skilled in the art that the arrangements shown in FIGS. 1 to 3 are exemplary only and that, rather than using common optical elements in the copying and facsimile scanning and recording modes of operation, separate optical systems could be used for the respective modes of operation. Further, rather than moving document 12 relative to an optical system that is stationary during exposure, the same result could be obtained using an optical scanning system employing moving optical elements to scan a fixed original.

Figures 4, 5, 6:
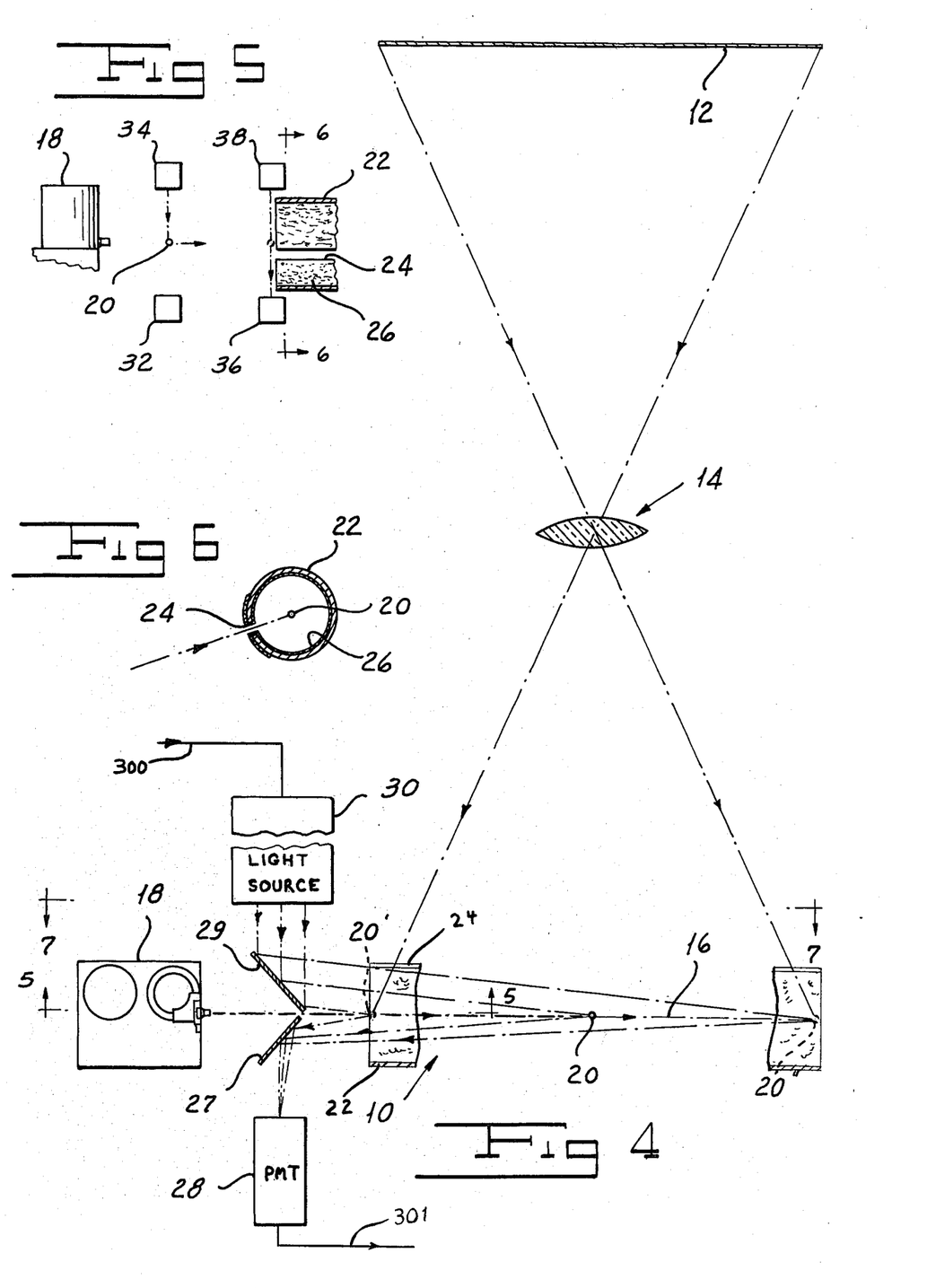
FIG. 4 is a top plan, with parts shown in section and with other parts omitted, of the virtual optical system of the copier of FIG. 1 in the scanning mode shown in FIG. 2, as seen by the facsimile scanner and recorder.
FIG. 5 is a fragmentary section of the facsimile scanner and recorder shown in FIG. 4, taken along line 5—5.
FIG. 6 is a section of the facsimile scanner and recorder shown in FIG. 4 taken along line 6—6 of FIG. 5.

Referring now to FIGS. 4 to 6, I show the optical system of the copier 182 in the facsimile scanning mode of operation shown in FIG. 2 as it virtually appears to the facsimile scanner 10—that is, with the optical reflectors 188, 190, 192 and 194 "removed" from the optical system. In the scanner 10, lens 14 forms a focused image of the original line pattern on a line or path 16, parallel to the axis of drum 196 in FIGS. 1 to 3, along which balls 20 are propelled from a firing assembly 18 in a manner to be described further below. To shield balls 20 traversing the path 16 from extraneous light, I dispose coaxially around the ball path 16 a tube 22, as shown in FIG. 6, formed with an axial slot 24 for admitting light from the lens 14. I coat the inner surface of the tube 22 and the outer surface portions adjacent the slot 24 with a lining 26 of velvet or other low-reflectance material.

Figure 12:
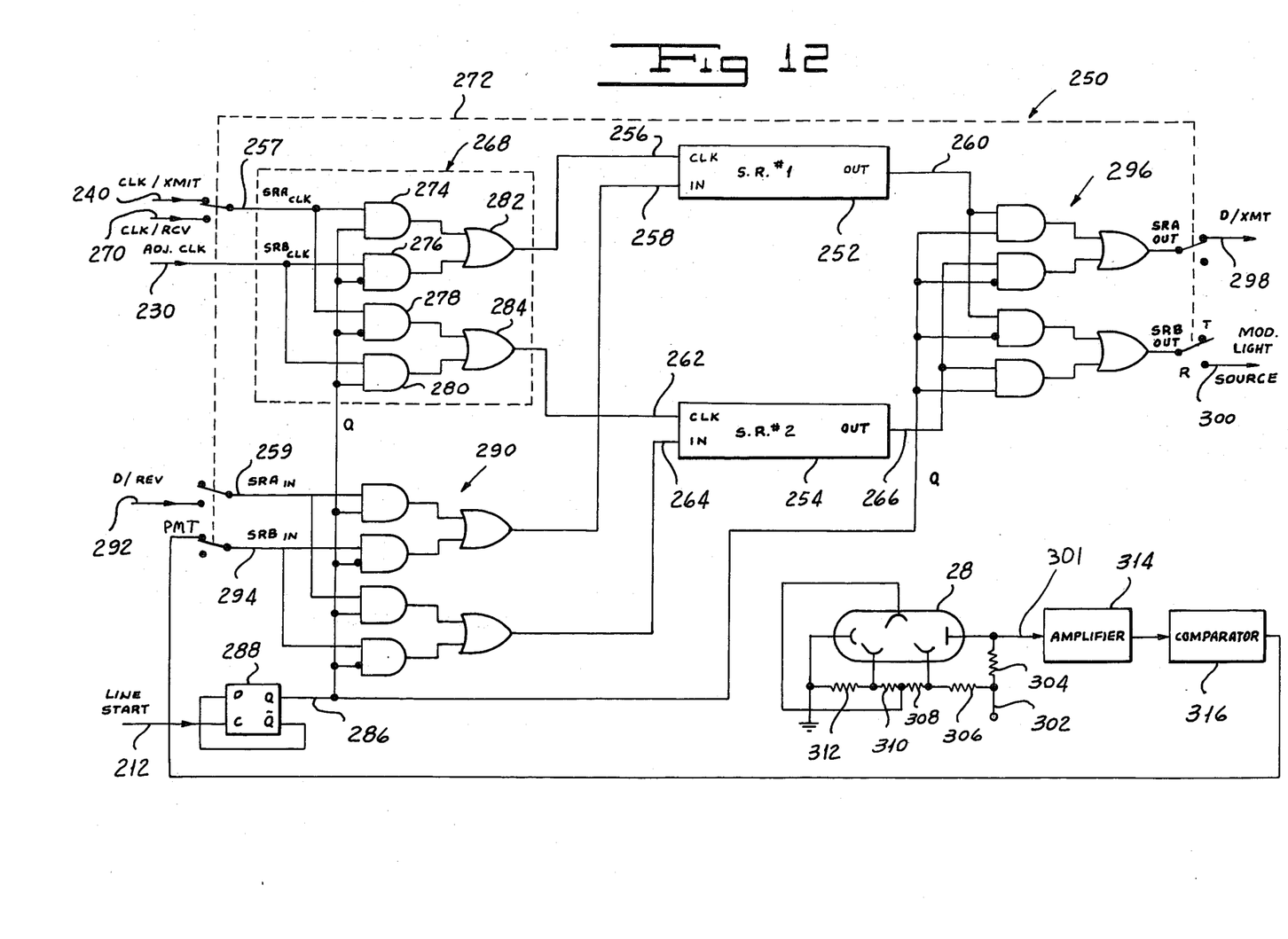
FIG. 12 is a schematic diagram of the data buffer circuit of the facsimile scanner and recorder shown in FIG. 4.

To detect light reflected from the balls 20 as they traverse the ball path 16, I dispose a suitable photodetector 28, preferably a photomultiplier tube, to achieve the required combination of bandwidth and sensitivity, at one end of the ball path 16. Conveniently, photodetector 28 may be located at the same end of the ball path 16 as firing assembly 18, with a reflector 27 being used to permit placing photodetector 28 in a position in which it does not interfere physically with the assembly 18. Referring also to FIG. 12, photomultiplier tube 28 has its anode coupled via line 301 to a high-speed amplifier 314 directly and to a high-voltage power supply line 302 through a load resistor 304. Line 302 is also coupled to a voltage-divider circuit comprising resistors 306, 308, 310 and 312, used to supply suitable voltages to the dynodes of photomultiplier tube 28. Amplifier 314 drives a high-speed comparator 316 which digitizes the amplified output of photoconductor 28.

The choice of a suitable photodetector depends principally on the intensity of the light source, the operating frequency, and the geometry of the system. In what follows, it will be assumed that the photodetector 28 is 10 mm by 10 mm, intercepts a total light flux of 80 nLm at a near ball distance (position 20') of 8 cm, and intercepts a total light flux of 4.4 nLm at a far ball distance (position 20") of 34 cm. It will be assumed further that a page 300 mm long by 260 mm wide is to be scanned in 3 seconds with a 0.1 mm resolution. This implies that a line should be scanned in one millisecond, and each elemental area in about 0.4 usec. A pulse rise time of 0.1 usec, or a 3dB bandwidth of 3.5 MHz, is therefore required. Further, to ensure a false-alarm rate of less than 1 sec$^{-1}$, the discriminator threshold, and hence the photodetector output for a far ball distance of 34 cm, should be at least four times the rms noise level of the photodetector.

I have found that a type 4840 photomultiplier tube with an S-20 type photocathode, also available as part of Integrated Photodetection Assembly PF 1039, is capable of satisfying these noise and bandwidth requirements. Another suitable photomultiplier tube, and preferable if available as part of an Integrated Photodetection Assembly, is type 4837. If the integrated assembly PF 1039 is used, the anode voltage should be suitably adjusted to provide a maximum signal-to-noise ratio. This occurs at an anode sensitivity of about 100 A/Lm. Further, to prevent the output capacitance of photomultiplier tube 28 from appreciably affecting the bandwidth, the anode resistor 304 should be no greater than about 600 ohms.

To direct light on the balls 20 in the recording mode of operation, in which light reflected from the balls 20 is focused by the lens 14 onto the surface of drum 196 (in this mode effectively in the position of the document 12 in FIG. 4), I dispose a high-intensity modulated light source 30 of any suitable type at the same end of the ball path 16. Light source 30, which is inactive in the scanning mode of the apparatus 10, contains an internal modulator (not separately shown) such as a Kerr cell modulator which modulates the output intensity of source 30 in response to a facsimile signal providing on a line 300 in a manner to be described. In a manner similar to that of reflector 27, a reflector 29 is used to direct light from source 30 along the ball path 16 inside tube 22. Preferably, light source 30 provides a collimated output beam to illuminate ball 20 with a constant light intensity as the ball traverses the path 16.

Figure 7:
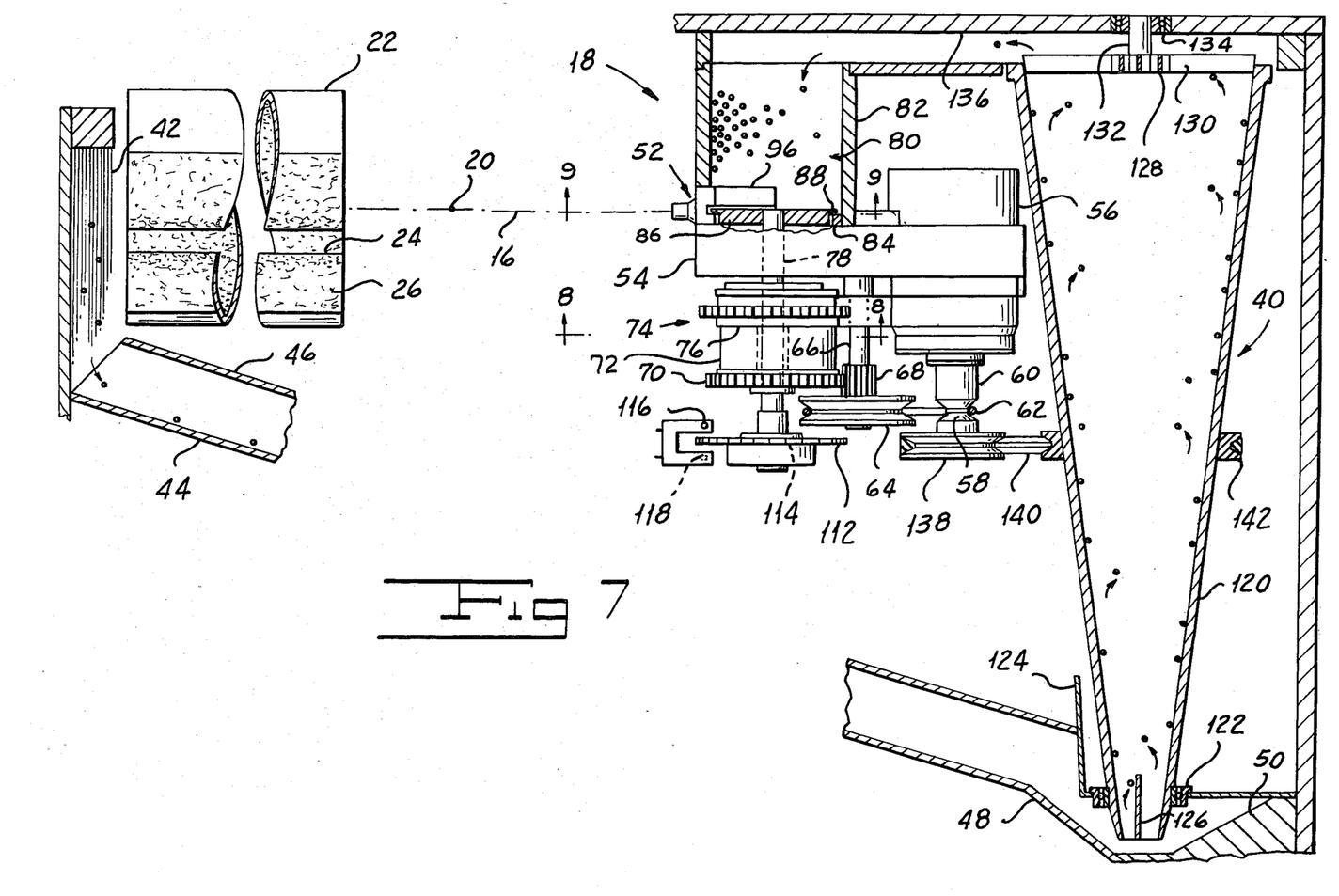
FIG. 7 is a fragmentary view of the facsimile scanner and recorder shown in FIG. 4 along line 7—7 of FIG. 4 with parts shown in section.

Referring now to FIG. 7, firing assembly 18 receives balls 20 to be fired from a ball return device indicated generally by the reference character 40, to be described in more detail below. Assembly 18 includes a ball gun indicated generally by the reference character 52 which directs the balls along path 16. Ball gun 52, to be described in more detail below, is supported by the frame 54 of the firing assembly 18. Balls fired from the gun 52 along path 16 are arrested by the bristles of a brush 42 disposed at the far end of the ball path 16 and are collected between a lower guide 44 and an upper guide 46 to be directed toward a region, at the lower end of device 40, by a guide plate 48 and by the upper surface of a cross brace 50.

A motor 56 is adapted to be energized to drive a first pulley 58 formed in the shaft 60 of the motor. A belt 62 connects pulley 58 to a pulley 64 carried by an idler shaft 66 supported on the frame 54. Shaft 66 carries a pinion 68 which meshes with a gear 70 carried by the input element 72 of a slip clutch indicated generally by the reference character 74. Clutch 74, which may be of any suitable type known to the art, includes an output element 76 carried by a shaft 78 for rotation therewith. Further as is known in the art, so long as the output element 76 is restrained against rotary movement, the input element 72 will rotate relative thereto. However, when the element 76 is free to rotate, clutch 74 clutches the elements 72 and 76 so that shaft 78 is driven by shaft 60.

Figures 8, 9, 10:
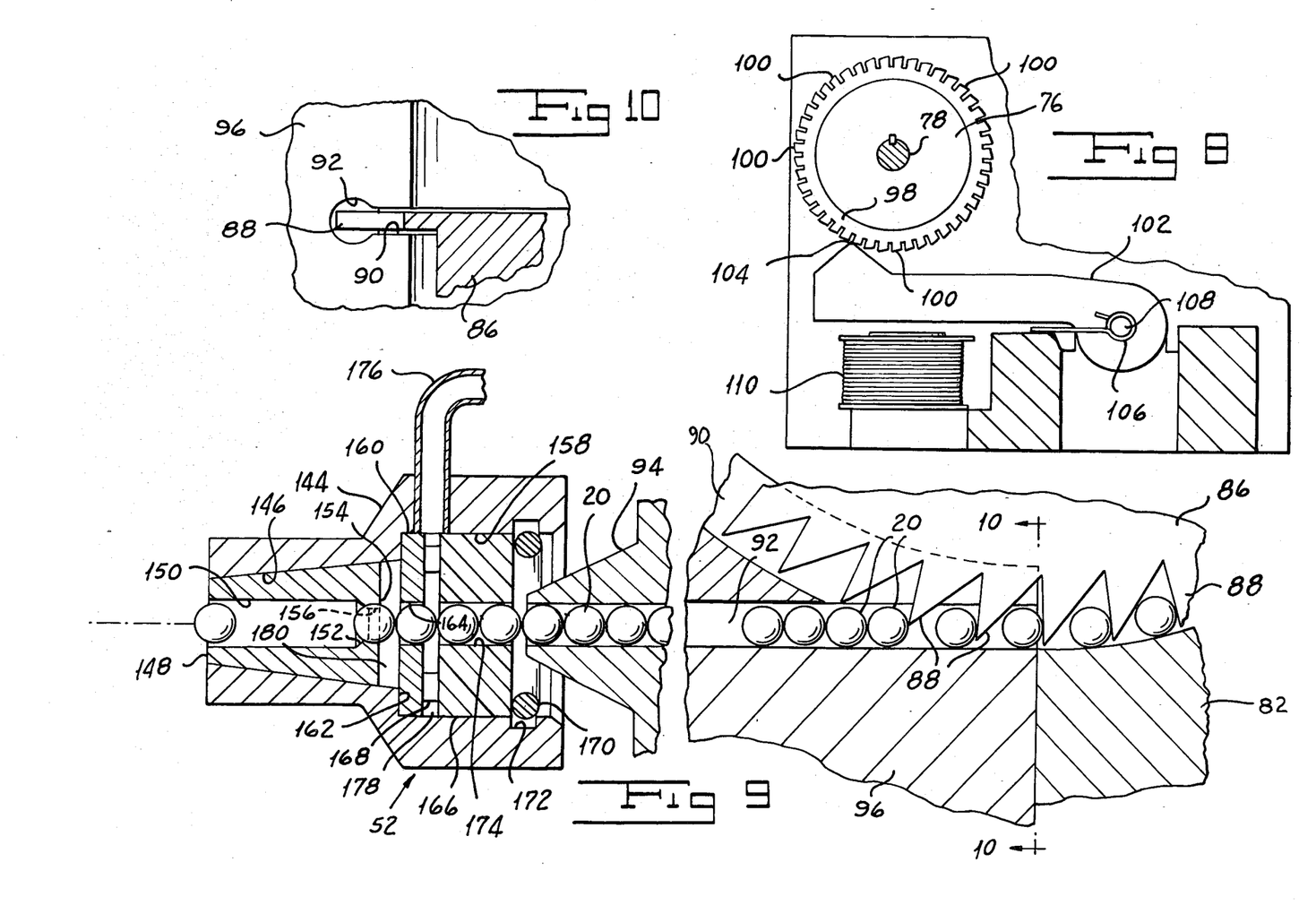
FIG. 8 is a fragmentary section of the ball firing assembly of the facsimile scanner and recorder shown in FIG. 4, taken along line 8—8 of FIG. 7.
FIG. 9 is a fragmentary section of the ball firing assembly of the facsimile scanner and recorder shown in FIG. 4, taken along line 9—9 of FIG. 7.
FIG. 10 is a fragmentary section of the ball firing assembly of the facsimile scanner and recorder shown in FIG. 4, taken along line 10—10 of FIG. 9.

Referring now also to FIGS. 9 and 10, ball firing assembly 18 includes a cylindrical ball storage bin, indicated generally by the reference character 80, including a wall 82 and an annular bottom 84, adapted to store a quantity of balls 20. Shaft 78 carries for rotation therewith a ball feeding element in the form of a saw blade 86 having a plurality of teeth 88. Balls 20 returned to the bin 80 in a manner to be described hereinbelow fall down onto the bottom 84 between the teeth 88 and the wall 82. As the shaft 78 rotates, teeth 88 carry the balls 20 around the bottom 84 and into a ball separator 96 formed with a slot 90 for receiving the blade 86 and with a passage 92 tangential to the circular ball path at the entrance thereof. Separator 96 strips the balls 20 from blade 86 by diverting the balls from their circular path and redirecting them along passage 92 to an outlet guide 94 leading to the gun 52.

Referring now to FIG. 8, I provide firing assembly 18 with means for releasing clutch element 76 for a period of time sufficient to cause blade 86 to move a ball 20 into the passage 92 to cause a ball to be fired. Shaft 78 carries for rotation therewith a stepping wheel 98 having a plurality of teeth 100 corresponding in number to the number of teeth 88 on the saw blade 86. A detent arm 102 formed of ferromagnetic material carries a detent 104 which normally is in engagement with one of the teeth 100 to prevent rotation of wheel 98 and shaft 78. A spring 106 normally urges the arm 102 to rotate around a pivot 108 to position the detent 104 in engagement with one of the teeth 100. An electromagnet 110 is adapted to be energized to act on arm 102 to move the arm against the action of spring 106 to a position at which detent 104 is out of engagement with the teeth 100 on wheel 98. When shaft 78 has rotated for a period of time sufficient to fire a ball 20, electromagnet 110 is de-energized to permit detent 104 to move back to its initial position to engage a tooth 100 to stop shaft 78.

Referring again to FIG. 7, shaft 78 also carries for rotation therewith a counter disc 112 provided with a plurality of holes 114 corresponding in number to the number of teeth 88 or teeth 100. A portion of disc 112 carrying the holes 114 is adapted to move through the space between a source of illumination 116 and a photodetector 118 to cause the photodetector to put out a signal each time a ball is fed into the passage 92 by the blade 86. Thus, a photodetector 118 puts out a digital signal indicating the number of balls which are fed during the period of time for which the electromagnet 110 is energized.

The "cyclone" ball return system 40 includes a hollow conical member 120 supported for rotary movement in a bearing 122 carried by a bracket 124 on the machine frame. The lower open end of the member 120 is disposed in the space formed by guide plate 48 and crossbrace 50 to which balls arrested by brush 42 are returned by guides 44 and 46. I provide the lower end of member 120 with a crossbrace 126 which assists the balls in entering the member 120 and moving upwardly along the inner wall thereof when the member 120 rotates in a manner to be described. I secure a cap 128 formed with a plurality of radially extending circumferentially spaced arms 130 in the upper end of member 120. A shaft 132 on the member 128 is rotatably received in a bearing 134 supported on a cover plate 136 on the firing assembly 18. A pulley 138 carried by shaft 60 for rotation therewith is connected by a belt 140 to a pulley 142 formed on the outside of member 120, so that as motor 56 is driven to spin the member 120 about its axis, balls from the return space adjacent to the bottom of member 120 enter the member and under the action of centrifugal force travel upwardly along the inner surface and through the space between arms 130 which hurl the balls along a passage leading to the bin 80.

Referring now to FIG. 9, gun 52 includes a body 144 having a conical bore 146 which receives a gun barrel 148. The gun barrel 148, which is formed of a suitable resilient material, has an outer conical surface conforming to the conical bore 146 so that the barrel is self-locating in the housing or body 144. Barrel 148 is formed with an inner cylindrical bore 150 of a diameter which is slightly greater than that of the balls 20. Bore 150 extends from the front of the barrel rearwardly toward a tapered portion 152 leading into a cylindrical sphincter or breech 154, having an opening 156 with a normal diameter, shown in dotted lines in FIG. 9, slightly less than that of the balls 20.

A recess 158 in the body 144 behind the conical bore 146 receives a loading guide 160 which bears against a shoulder 162 at the juncture between bore 146 and recess 158. Guide 160 has a central opening 164 of a diameter which is slightly greater than that of a ball 20 by, for example, 0.01 mm. I position a pressure seal 166 within recess 158 behind guide 160 and spaced therefrom by spacers 168. A spring clip 170 disposed in an annular recess 172 holds the pressure seal 166 in position. I form the seal 166 with a central passage 174 having a diameter substantially equal to the diameter of a ball 20, which passage 174 leads from the outlet of guide 94 and is aligned with the passage 92 in separator 96. An air inlet 176 admits air under pressure through the wall of body 144 to the antechamber 178 between guide 160 and seal 166. The arrangement of my gun assembly is such that the rear of barrel 148 is spaced from guide 160 to form a pressure chamber 180.

In operation of my microballistic scanner, if the apparatus is in the quiescent state, blade 86 will have advanced balls to such a position that the leading ball engages the breech 154 so as to form a seal therewith to permit a pressure buildup in pressure chamber 180. From the leading ball counting rearwardly three balls, there will be a ball 20 which is positioned at the rear of seal 166 and which is in engagement with the ball 20 about to emerge from the guide 94.

As the blade 86 rotates, the force of a tooth 88 thereof is exerted on the line of balls 20 between the ball in the breech 154 and the last ball being acted on by the tooth so as to dislodge the ball from the breech. This permits the air in the pressure chamber 180 to expand into the bore 150, expelling the ball 20 therefrom. After the first ball has been fired, the next ball moves into position in opening 156 to form a seal therewith and the pressure in the chamber 180 again builds up to its initial value.

To measure the exact velocity of a ball 20 propelled from the assembly 18 for proper synchronization, I dispose a first photodetector 32 and light source 34, shown in FIG. 5, on opposite sides of a portion of the ball path 16 near the assembly 18 so that a ball 20 that has reached the solid-line position of FIG. 5 interrupts a light beam between source 34 and photodetector 32. I dispose a second photodetector 36 and a light source 38, shown in FIG. 5, on opposite sides of a downstream portion of the ball path 16 so that the same ball 20 interrupts a light beam between source 38 and sensor 36 when it reaches the broken-line position shown in FIG. 5. Photodetectors 32 and 36 thus provide outputs separated by a time delay indicating the speed at which a ball 20 is traversing the ball path 16.

The total time required to scan a document page, ignoring retrace times and the like, is given by the formula $$T = LWn/u,$$

where L and W are the length and width, respectively, of the document page, n is the number of scanning lines per unit length, and u is the ball firing velocity. Thus, for a document page that is 260 mm wide by 300 mm long, a scanning resolution of 10 lines/mm, and a firing velocity of 40 m/sec, the time required to scan a page is 19.5 sec. If, on the other hand, for example, the ball firing velocity is increased to 260 m/sec the total scanning time is reduced to only 3 sec. Typically, for a peak chamber pressure of 4 to 6 atmospheres, for a barrel length of 3.0 mm, and for a barrel and ball diameter of 0.8 mm, the ball exit velocity ranges between about 20 and 40 m/sec. The ball velocity may be increased over these figures by increasing the chamber pressure and barrel length, decreasing the ball size, forming the balls of a lighter material, or employing some combination of these expedients.

Figure 11:
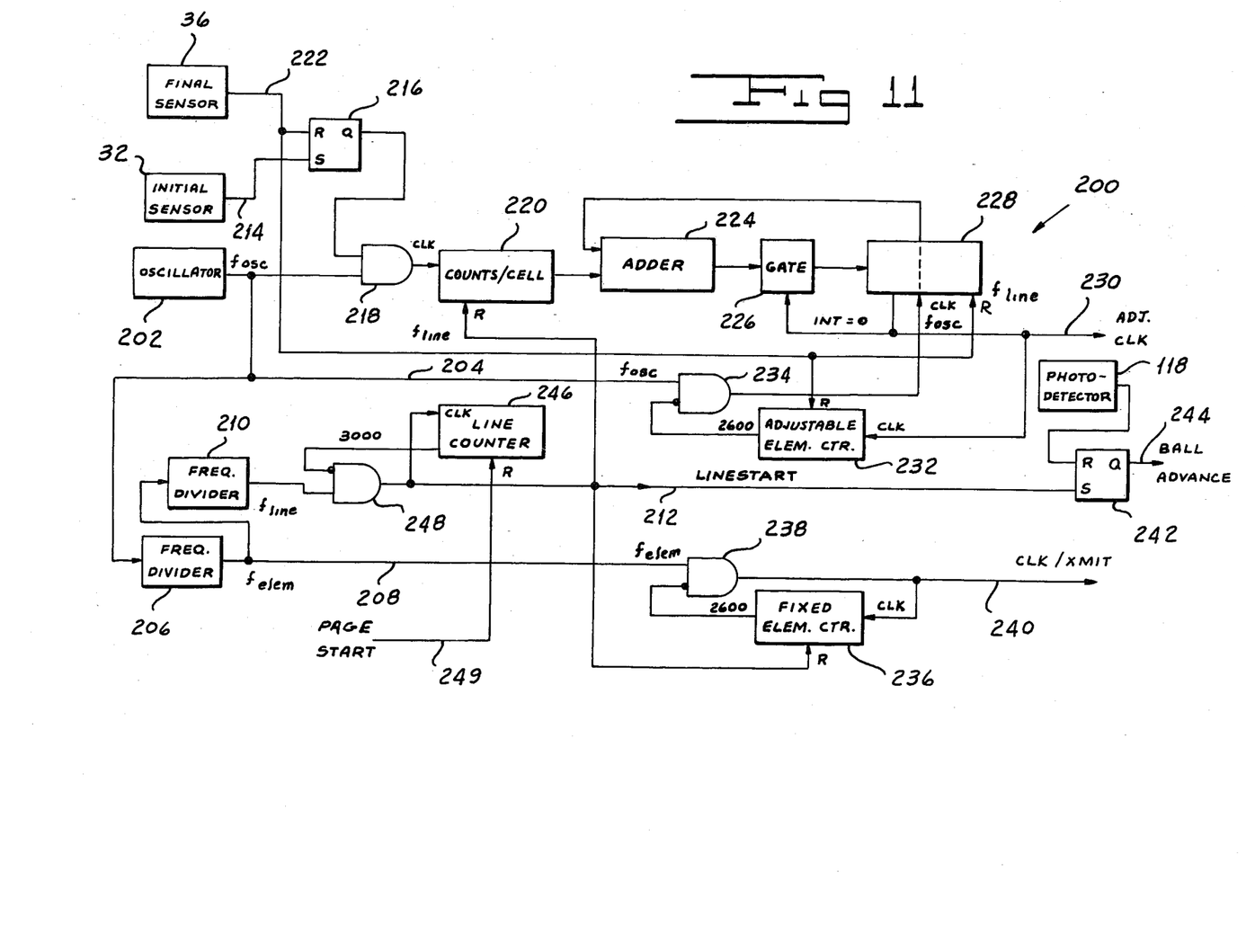
FIG. 11 is a schematic diagram of a circuit for controlling the operation of the facsimile scanner and recorder shown in FIG. 4.

Referring now to FIG. 11, the control circuit for my scanner 10, indicated generally by the reference numeral 200, includes a high-frequency ($f_{osc}$) oscillator 202 which provides a basic timing signal to a line 204. A frequency divider 206 coupled to line 204 provides a lower-frequency signal corresponding to the basic picture element scanning rate ($f_{elem}$) on a line 208. Another frequency divider 210 responsive to line 208 generates an even lower frequency signal corresponding to the frequency at which lines are scanned by the scanner 10 ($f_{line}$).

Frequency divider 210 feeds one input of a two-input AND gate 248. AND gate 248 provides an output on a line 212 as well as to the clock input of a "line" counter 246. Line counter 246 is reset in response to a signal provided to it on a "page start" line 249 and supplies an output to an inhibiting input of AND gate 248 when its count reaches 3000, the number of lines on a page being scanned.

Initially, line counter 246 contains a count of 3000 so that gate 248 is inhibited and no signal appears on line 212. In response to a signal on line 249 initiating the scanning of a page, counter 246 is reset, removing the inhibiting signal from AND gate 248. As a result, frequency divider 210 supplies a pulse on line 212 to the S input of a ball advance flip-flop 242. This pulse sets flip-flop 242 to provide a signal on line 244 from the Q output of flip-flop 242 to the electromagnet 110 of the firing assembly 18. As a result, assembly 18 fires a ball 20 from gun 52 along the ball path 16. Flip-flop 242 is reset following the firing of a ball 20 from the assembly 18 by a signal provided from the photodetector 118 of the firing assembly.

In response to the interruption of a light beam from source 34 as the ball 20 traverses the path 16, photodetector 32 provides a set signal on a line 214 to a flip-flop 216, the Q output of which feeds one input of an AND gate 218. AND gate 218 receives its other input from oscillator 202 and provides an output to the clock input of a counter 220. Thus, in response to the setting of flip-flop 216 by the initial photodetector 32, counter 220, which was initially reset by the pulse on line 212, begins to count.

When, a short time later, the ball 20 interrupts the light beam between source 38 and a photodetector 36, photodetector 36 provides a signal on line 222 to reset flip-flop 216, disabling the clock input to counter 220. Thus, as the ball 20 moves onto the portion of the ball path 16 on which the line image is focused, counter 220 stores a count proportional to the period of time required to traverse the distance between detectors 32 and 36. Conveniently, sensors 32 and 36 may be spaced 51.2 mm, or 512 picture elements, apart, so that the 9 least significant bits of counter 220 store the fractional part of the number of counts of oscillator 202 per picture element, while the remaining bits of counter store the integral part of the number of counts per picture element.

Counter 220 is used to time the generation of shift pulses that coincide with the actual arrival of the ball 20 at a particular element of a line, taking into account the actual measured speed of the ball 20. To this end, I couple the outputs of counter 220 to one set of inputs of a parallel adder 224. Adder 224 has its outputs, shown in FIG. 11 as a single line for the sake of convenience, coupled through a gate 226 to the input of a programmable counter 228. Counter 228 has its outputs coupled to the other bit inputs of parallel adder 224. Counter 228 receives a decrementing clock input from an AND gate 234 receiving one input from the oscillator line 204 and receiving an inhibiting input from an "adjustable element" counter 232. Counter 232 provides an inhibiting input to AND gate 234 whenever it stores a count of 2600, corresponding to the number of elements in a line to be scanned, and receives a reset signal from line 222 coupled to the downstream photodetector 36. Counter 228 supplies a clock input to counter 232 and an "adjustable clock" line 230 whenever the "integer" portion of the content of counter 228—that is, the count represented by the 10th and more significant bits of counter 228—is zero. Counter 228 also supplies a gating pulse at this point to gate 226.

The operation of counter 228 in timing the generation of pulses corresponding to the actual arrival of the ball 20 at a particular element location is as follows. Assume that counter 220 has been loaded with a quantity indicating a ball speed of 7.5 counts of oscillator 202 per picture element. Counter 228, reset by a signal on line 222 in response to the arrive of the ball 20 at sensor 36, provides a signal on line 230 to gate 226 to load into counter 228 a signal indicating 7.5 counts. The signal on line 222 also activates adjustable element counter 232 so that gate 234 supplies a decrementing signal at the frequency of oscillator 202 to the integer portion of counter 228. On the seventh such signal from gate 234, counter 228 will have been decremented to a count of 0.5. Since the integer portion of counter 228 is now zero, counter 228 supplies a pulse to gate 226, causing the counter 228 to be reloaded with the sum of its present content, which is 0.5, and the count stored in counter 220, which is 7.5.

Counter 228, which now stores a count of 8, continues to be decremented by the signal from gate 234 in the manner described previously. Upon the fifteenth such count, counter 228 is decremented to zero. Since the integer portion of counter 228 is now again equal to zero, gate 226 is again actuated to load counter 228 with its present count plus the count of counter 220, or 7.5. By virtue of this process, line 230 is supplied with pulses coincident with pulses on line 204, but having an average spacing corresponding to the number of counts per picture element stored in counter 220. Preferably, the oscillator frequency $f_{osc}$ should be sufficiently high compared with the picture element scanning rate $f_{elem}$ that the error in picture element location due to quantization of the number of counts per picture element is comparable with the picture element length of 0.1 mm.

Line 230, the "adjustable clock" clock line, clocks a shift register to be described which either shifts bit information in from the photomultiplier 28, or shifts out such information to the light source 30, depending on the mode of the scanner 10. When line 230 has provided a number of pulses equal to the number of picture elements in a line, counter 232 supplies an inhibiting input to gate 234, inhibiting the further clocking of counter 228 and thus the further generation of pulses on line 230.

Line 208 also feeds one input of an AND gate 238, the output of which feeds a "clock transmit line" 240. Line 240 feeds the clock input of a "fixed element" counter 236 which receives a reset signal from line 212. Counter 236 supplies an inhibiting signal to AND gate 238 when it reaches a count of 2600, the number of picture elements in a line. Counter 236 initially stores an inhibiting count of 2600, but is reset in response to the line start signal on line 212. When this happens, counter 236 removes the inhibiting input from AND gate 238 to allow the gate to supply picture-element-frequency pulses from line 208 to line 240. When 2600 such pulses have been supplied to line 240, counter 236 again reaches a count of 2600, inhibiting AND gate 238 to inhibit further pulses on line 240. Line 240 is used to control the shifting of information to or from the other shift register to be described which has been controlled during the previous cycle by the clock signal on line 230.

Referring now to FIG. 12, the data buffer circuit, indicated generally by the reference numeral 250, includes a pair of shift registers 252 and 254, each of which contains 2600 bits corresponding to the picture elements in a line. Shift registers 252 and 254 are used alternately to accumulate and then to shift out information accumulated on a previous cycle. Thus, in the scanning mode of the scanner 10, shift register 252 will alternate between accumulating digital information from the photomultiplier 28 and shifting out that information on a "data transmit" line 298 to, for example, a remote facsimile receiver or recorder (not shown). Shift register 254 functions similarly in this mode of the scanner 10, but accumulates while shift register 252 is shifting out information, and shifts out information while register 252 is accumulating the bits of a subsequent line.

Similarly, in the recording mode of the scanner 10, shift register 252 alternates between accumulating bit information from a "data receive" line 292 coupled, for example, to a remote facsimile transmitter or scanner (not shown) and shifting out that information to the light source 30 illuminating the ball 20 traversing the path 16. Shift register 254 again performs the same operations but in opposition to the operation of shift register 252. Shift registers 252 and 254 are used as a buffer in both the transmitting and receiving modes of the scanner to accommodate any variation between the velocity of the ball 20 in the local scanner 10 and the velocity of the ball 20 in the remote scanner (not shown) to which the local scanner 10 is coupled.

More particularly, in the buffer circuit 250, a routing circuit indicated generally by the reference numeral 268 couples clock input lines 256 and 262 of registers 252 and 254 to the adjustable clock line 230 and to a line 257. Line 257 in turn is connected to the clock transmit line 240 when the apparatus is in a scanning mode and to a clock receive line 270 coupled to a remote unit (not shown) when the apparatus is in a receiving or recording mode. I couple the clock, or C, input of a D-type flip-flop 288 to the "line start" line 212 and the D input to the $\overline{Q}$ output of the flip-flop so that flip-flop 288 changes state each time it receives a line start pulse on line 212. Flip-flop 288 provides an output signal on a line 286 which controls circuit 268 and other routing circuits to be described coupled to shift registers 252 and 254. When line 286 is at a high logic level, line 257 is coupled to the clock input line 256 of register 252, while line 230 is coupled to the clock input line 262 of register 254. Conversely, when line 286 carries a low-level logic signal, clock input line 256 of register 252 responds to the adjustable clock line 230 while the clock input line of register 254 responds to line 257.

In a like manner, I couple the respective data input lines 258 and 264 of registers 252 and 254 to the outputs of a routing circuit 290 identical to the circuit 268. Whenever line 286 from flip-flop 288 carries a high-level logic signal, data input line 258 of register 252 responds to a line 259 which is coupled via data receive line 292 to a remote unit (not shown) whenever the apparatus 10 is in a recording mode. At the same time, data input line 264 of register 254 is responsive to a line 294 coupled to the output of comparator 316 whenever the apparatus 10 is in a scanning mode. Conversely, whenever line 286 from flip-flop 288 carries a low-level logic signal, data input lines 258 and 264 are coupled to lines 294 and 259 respectively.

Finally, I couple the data output lines 260 and 266 of shift registers 252 and 254 to a third routing circuit 296, identical to circuits 268 and 290. Whenever line 286 from flip-flop 288 carries a high-level logic signal, data output line 260 is coupled to a data transmit line 298, connected to a remote unit (not shown) whenever the apparatus is in a scanning mode. At the same time, data output line 266 of register 254 is coupled to a line 300 coupled to the modulated light source 30 whenever the apparatus is in a recording mode. Conversely, when line 286 carries a low-level logic signal, line 260 feeds line 298 in the scanning mode of the apparatus while line 266 feeds line 300 in the recording mode of the apparatus 10. A five-pole double-throw transmit-receive switch 272 provides lines 257, 259, 294, 298 and 300 with the proper inputs for the scanning and recording modes of operation.

Although the actual diameter of the balls 20 is about one millimeter, their effective diameter as sensed by the detector 28 is much smaller owing to the shape and specular reflectance of the balls 20, which act as divergent reflectors. Thus, for a ball diameter of one millimeter, a lens-to-focal plane distance of 230 mm, a near ball distance of 80 mm from the detector 28, a lens diameter of 56 mm, and detector dimensions of 5 mm by 5 mm, the effective size of the balls is about 0.06 mm across the line of the paper being scanned and about 0.08 mm along the same line. Since the lens aperture is substantially larger than the dimensions of the photodetector 28, the detector dimensions may readily be increased to, for example, 10 mm by 10 mm to increase sensitivity without appreciably affecting the overall resolution. In a similar manner, for a light source 30 having an aperture substantially less than that of the lens 14, the effective size of the balls 20 in the recording mode of the scanner 10 is substantially less than their actual size of one millimeter.

It is possible to use light-refractive projectiles formed of glass, transparent plastic or the like rather than the light-reflective balls 20 described above. In such a case, however, the effective size of the projectiles would approximate their actual size, necessitating the use of smaller projectiles to obtain comparable resolution. It is also possible to guide the balls 20 along the path 16 by means of a transparent tube or the like (not shown) rather than simply allowing the balls to traverse the path in free flight. While the tube walls would produce some undesirable scattering of light and mechanical interference along the ball path, the use of such a tube may be desirable in certain cases to ensure a straight-line path.

It will be seen that I have accomplished the objects of my invention. My facsimile scanner can operate in either a scanning or a recording mode, and is capable of high-speed, high resolution operation. My facsimile scanner is compatible with an electrophotographic copier, and is relatively immune from the effects of mechanical vibration. My facsimile scanner ensures the registration of successive scanning lines. Finally, my facsimile scanner is simple and inexpensive.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Apparatus for recording a facsimile signal including in combination means for illuminating a predetermined path, means responsive to said facsimile signal for modulating the light from said illuminating means, a plurality of projectiles adapted to divert from their direction of incidence rays of light impinging thereon, means for successively propelling said projectiles along said path in timed relation with said facsimile signal to produce corresponding patterns of light from said projectiles along said path, and means for forming an optical image of said patterns on successive portions of a recording medium.

2. Apparatus for recording a facsimile signal including in combination means for illuminating a predetermined path, means for modulating the light from said illuminating means as a function of said facsimile signal, a projectile adapted to divert from its direction of incidence a ray of light impinging thereon, means for propelling said projectile along said path to produce a pattern of light diverted by said projectile along said path, means for forming an optical image of said pattern on a recording medium, means for measuring the velocity at which said projectile traverses said path, and means responsive to said measuring means for controlling the rate at which said light from said illuminating means is modulated.

3. Apparatus for recording a facsimile signal including in combination means for illuminating a predetermined path, means responsive to said facsimile signal for modulating the light from said illuminating means, a projectile adapted to divert from its direction of incidence a ray of light impinging thereon, means for propelling said projectile in free flight along said path to produce a pattern of light diverted by said projectile along said path, and means for forming an optical image of said pattern on a recording medium.

4. Apparatus for recording a facsimile signal including in combination means for illuminating a predetermined path, means responsive to said facsimile signal for modulating the light from said illuminating means, a spherical projectile adapted to reflect specularly a ray of light impinging thereon, means for propelling said projectile along said path to produce a pattern of light reflected by said projectile along said path, and means for forming an optical image of said pattern on a recording medium.

5. Apparatus for recording a facsimile signal including in combination means for illuminating a predetermined path, means responsive to said facsimile signal for modulating the light from said illuminating means, a projectile adapted to reflect a ray of light impinging thereon, means for propelling said projectile along said path to produce a pattern of light reflected by said projectile along said path, and means for forming an optical image of said pattern on a recording medium.

6. Apparatus for recording a facsimile signal including in combination means for illuminating a predetermined path, means responsive to said facsimile signal for modulating the light from said illuminating means, a projectile adapted to refract from its direction of incidence a ray of light impinging thereon, means for propelling said projectile along said path to produce a pattern of light refracted by said projectile along said path, and means for forming an optical image of said pattern on a recording medium.

7. Apparatus for recording a facsimile signal including in combination means for illuminating a predetermined path, means responsive to said facsimile signal for modulating the light from said illuminating means, a projectile adapted to divert from its direction of incidence a ray of light impinging thereon, means for propelling said projectile along said path to produce a pattern of light diverted by said projectile along said path, and means for forming an optical image of said pattern on a recording medium.

8. Apparatus for scanning an original to produce a facsimile signal including in combination means for forming a generally planar optical image of said original, means for moving the image in a certain direction, a plurality of projectiles adapted to divert from their direction of incidence rays of light impinging thereon, means for successively propelling said projectiles along a path in the image plane generally orthogonal to said direction to divert rays of light making up said image from said path, and means responsive to said diverted rays for producing said facsimile signal.

9. Apparatus for scanning an original to produce a facsimile signal including in combination means for forming an optical image of a line of said original, a projectile adapted to divert from its direction of incidence a ray of light impinging thereon, means for propelling said projectile along a path coincident with said image to divert rays of light making up said image from said path, means responsive to said diverted rays for generating an electrical output, means for periodically sampling said output to provide a facsimile signal, means for measuring the velocity at which said projectile traverses said path, and means responsive to said measuring means for controlling the frequency of said sampling means.

10. Apparatus for scanning an original to produce a facsimile signal including in combination means for forming an optical image of a line of said original, a projectile adapted to divert from its direction of incidence a ray of light impinging thereon, means for propelling said projectile in free flight along a path coincident with said image to divert rays of light making up said image from said path, and means responsive to said diverted rays for producing said facsimile signal.

11. Apparatus for scanning an original to produce a facsimile signal including in combination means for forming an optical image of a line of said original, a spherical projectile adapted to reflect specularly a ray of light impinging thereon, means for propelling said projectile along a path coincident with said image to reflect rays of light making up said image from said path, and means responsive to said reflected rays for producing said facsimile signal.

12. Apparatus for scanning an original to produce a facsimile signal including in combination means for forming an optical image of a line of said original, a projectile adapted to reflect a ray of light impinging thereon, means for propelling said projectile along a path coincident with said image to reflect rays of light making up said image from said path, and means responsive to said reflected rays for producing said facsimile signal.

13. Apparatus for scanning an original to produce a facsimile signal including in combination means for forming an optical image of a line of said original, a projectile adapted to refract from its direction of incidence a ray of light impinging thereon, means for propelling said projectile along a path coincident with said image to refract rays of light making up said image from said path, and means responsive to said refracted rays for producing said facsimile signal.

14. Apparatus for scanning an original to produce a facsimile signal including in combination means for forming an optical image of a line of said original, a projectile adapted to divert from its direction of incidence a ray of light impinging thereon, means for propelling said projectile along a path coincident with said image to divert rays of light making up said image from said path, and means responsive to said diverted rays for producing said facsimile signal.

* * * * *